United States Patent
Navon et al.

(10) Patent No.: US 11,379,031 B2
(45) Date of Patent: Jul. 5, 2022

(54) POWER-ENDURANCE MODES FOR DATA CENTER SOLID-STATE DRIVES

(71) Applicant: Western Digital Technologies, Inc., San Jose, CA (US)

(72) Inventors: Ariel Navon, Revava (IL); Eran Sharon, Rishon Lezion (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 143 days.

(21) Appl. No.: 16/917,206

(22) Filed: Jun. 30, 2020

(65) Prior Publication Data
US 2021/0405731 A1  Dec. 30, 2021

(51) Int. Cl.
G06F 1/32 (2019.01)
G06F 1/10 (2006.01)
G06F 1/3234 (2019.01)
G06F 11/10 (2006.01)

(52) U.S. Cl.
CPC ........ G06F 1/3275 (2013.01); G06F 11/1076 (2013.01)

(58) Field of Classification Search
CPC .......................... G06F 1/3275; G06F 11/1076
See application file for complete search history.

(56) References Cited

U.S. PATENT DOCUMENTS

2006/0282610 A1* 12/2006 Dariel .................. G06F 3/0679
                                                711/103
2021/0034553 A1*  2/2021 Byron ................ G06F 13/1668

* cited by examiner

Primary Examiner — Stefan Stoynov
(74) Attorney, Agent, or Firm — Volpe Koenig (57) ABSTRACT

An apparatus includes memory arrays and a power-performance-endurance manager module. The power-performance-endurance manager module stores a power-endurance state descriptor data structure, which includes endurance levels associated with power-endurance modes. The manager module dynamically configures the apparatus to operate the memory arrays according to one of the power-endurance modes based on a desired endurance level.

20 Claims, 5 Drawing Sheets

POWER-ENDURANCE MODES FOR DATA CENTER SOLID-STATE DRIVES

BACKGROUND

This disclosure relates generally to solid-state drives (SSDs), and more particularly, to power-endurance modes for data center SSDs.

A data center, in general, is a dedicated space to house computer and storage systems, which can include SSDs and hosts. A SSD may include an integrated circuit assembly to store data persistently, typically using flash memory (i.e., an electronic non-volatile computer memory storage medium that can be electrically erased and reprogrammed). A host may be an interface or backplane (e.g., host interface control block) that manages operations of one or more SSDs connected thereto. For instance, a group of SSDs connected to a host store programs and applications, as well as data used by the programs and the applications, according to instructions from that host. Further, the host can govern power consumption and memory performance of the SSDs with respect to storing the programs, the applications, and the data.

Conventionally, to manage the power consumption and the performance of the SSDs, the host uss non-volatile memory express (NVMe) standards, which define power states. Based on the needs of the data center and/or the programs and the applications being executed, the host can prioritize the power consumption and the memory performance when selecting a power state from the NVMe standards. However, at present, the power states of the NVMe standards do not account for SSD "device endurance". Device endurance is a non-conventional characteristic of the SSDs that describes an ability of the SSDs to remain active for a long period of time. Due to device wear and in view of conventional NVMe standards, a need exists to provide improved data center operations by managing power consumption and memory performance for SSDs while accounting for device endurance.

SUMMARY

Various embodiments of SSDs are disclosed. Broadly speaking, an apparatus is provided that includes memory arrays and a power-performance-endurance manager (PPEM) module. The PPEM module stores a power-endurance state descriptor data structure, which includes endurance levels associated with power-endurance modes. The PPEM module dynamically configures the apparatus to operate the memory arrays according to one of the power-endurance modes based on a desired endurance level of the endurance levels.

According to one or more embodiments, the apparatus can be implemented as a method, a computing device, a system, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION OF EMBODIMENTS

Disclosed herein are methods and systems for implementing power-endurance modes for data center SSDs. More particularly, this disclosure relates to including in data center SSDs a PPEM module that associates device endurance with power consumption and memory performance to increase terabytes written (TBW) for the data center SSDs and reduce management and power costs for data center providers.

For example, according to one or more embodiments, a data center SSD includes a PPEM module that stores a power-endurance state descriptor data structure. The power-endurance state descriptor data structure associates endurance levels with power-endurance modes. The PPEM module, in turn, dynamically configures its corresponding data center SSD to operate memory arrays therein using the power-endurance state descriptor data structure by selecting one of the power-endurance modes based on a desired endurance level. The PPEM module can receive instructions from a host that identify the desired endurance level and cause the selection of the power-endurance mode. The PPEM module can also directly select the power-endurance mode based on operations of the corresponding data center SSD without host instructions.

The technical effects and benefits of the PPEM module (e.g., and the implementation of the power-endurance state descriptor data structure that associates endurance levels with power-endurance modes) include reducing an accumulated stress on cells of the SSDs and increasing a programmed erase cycle (PEC) of programmed cells of the SSDs, which means a longer life time (e.g., operational life) for the SSDs. The PPEM module and the implementation of the power-endurance state descriptor data structure can be practically applied to and used for effective management of data centers and components therein.

Figure 1:
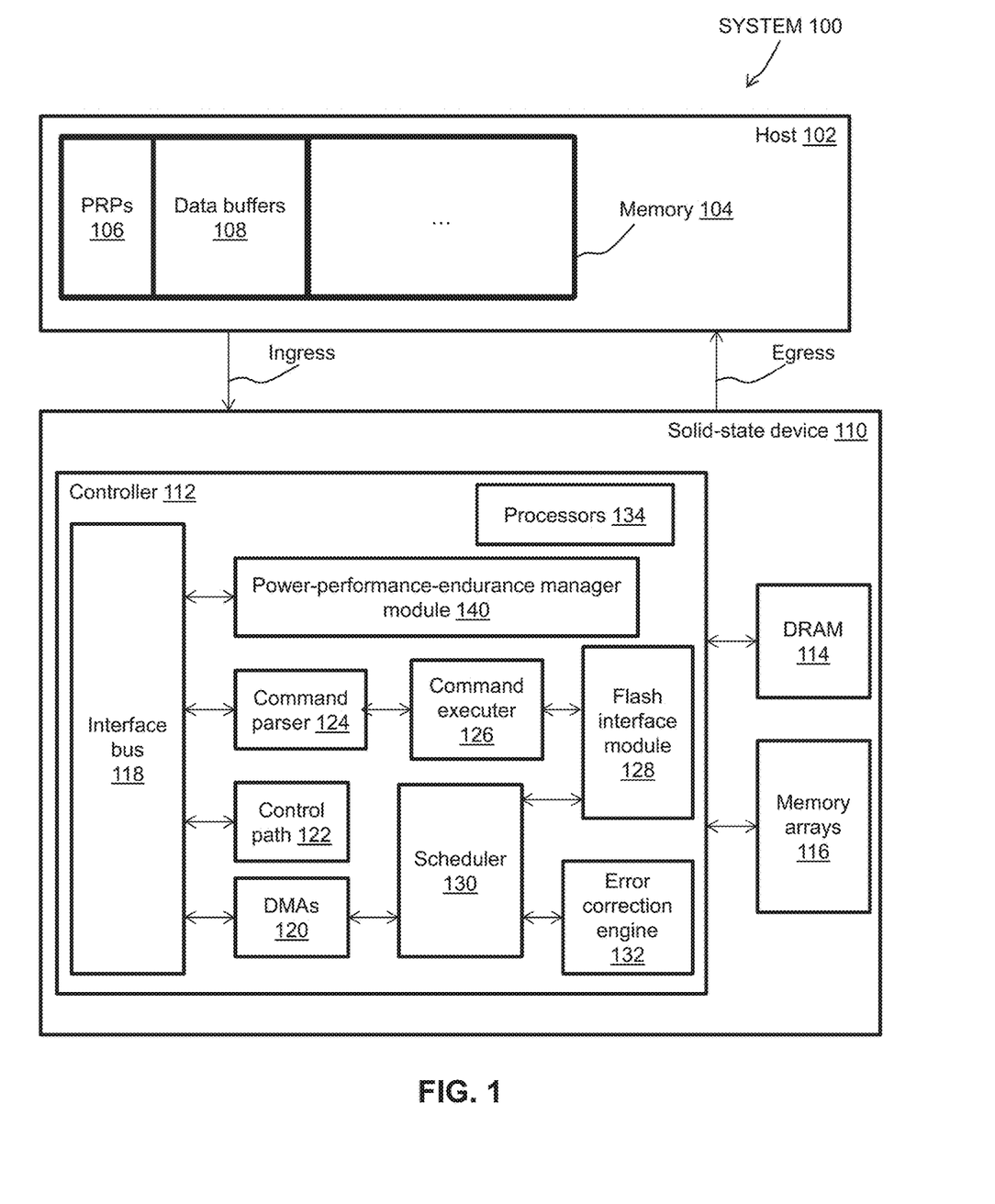
FIG. 1 is a generalized block diagram depicting a system including a solid-state device according to one or more embodiments.

FIG. 1 is a generalized block diagram depicting a system 100 (e.g., a memory system) according to one or more embodiments. The system 100 includes components comprising hardware and/or software, such as a host 102. The host 102 can include a number of hardware and/or software components, such as a host memory 104. The host memory 104 may have a number of zones, such as physical region pages (PRPs) 106 (e.g., indicate pointers to a host address that reflects data placement) and data buffers 108 (e.g., a region of the host memory 104 used to temporarily store data while the data is being moved).

The host 102 is in communication with and manages operations to (ingress arrow) and from (egress arrow) at least one solid-state device 110 (e.g., a data center SSD). In accordance with one or more embodiments, the host 102 can provide and configure transitions tables to the SSD 110 (or even generate and provide a transition state machine, which may include conditional transition, which depends also on the previous states). The host 102 can directly manage and set power-endurance modes for the SSD 110. According to embodiments, multiple SSDs 110 may be provided; however, for purposes of conciseness, the single SSD 110 is described herein. Further, it is understood that any single item of the system 100 may represent multiple instances of that item.

The SSD 110 includes components comprising hardware and/or software, such as a controller 112 in communication with a dynamic random-access memory (DRAM) 114 and memory arrays 116 (e.g., memory flash arrays or a plurality of memory arrays). The memory arrays 116 can be formed using various technologies, such as NAND and NOR logic circuitry, and may comprise one or multiple dies, as is known in the art. The memory arrays 116 also can store 1 or more data bits per cell. That is, the memory arrays 116 may include SLC (single level cells), MLC (multilevel cells), TLC (triple level cells), or QLC (Quad level cells), as is known in the art. The SSD 110 integrates the controller 112 and the memory arrays 116 to store data persistently.

The controller 112, in general, is a circuit used to control and manage operations of the SSD 110. The controller 112 also may include a DRAM 114, which may be used as a cache for managing reading and writing data to the memory arrays 116. The controller 112 includes components comprising hardware and/or software, such as an interface bus 118, direct memory accesses (DMAs) 120, a control path 122, a command parser 124, a command executer 126, a flash interface module 128, a scheduler 130, an error correction engine 132, processors 134, and a PPEM module 140. In accordance with one or more embodiments, the controller 112, in operation, uses these components to implement one or more configurations (e.g., power-endurance mode selections) with respect to different dies of the SSD 110 and/or the memory arrays 116 and/or to directly implement autonomous power-performance-endurance state transitions. For instance, one or more dies of the memory arrays 116 can be individually managed by the controller (or the host) using the power-endurance mode. In this regard, within the same memory array 116, a first set of dies supporting a first application can execute according to a first power-endurance mode, while a second set of dies supporting a second application can execute according to a different power-endurance mode.

In accordance with one or more embodiments, the SSD 110 and more specifically the controller 112 may have a state machine that controls the power-endurance mode transitions autonomously. In this regard, the controller 122 and/or the PPEM module 140 can execute an "auto-mode" for self-transfer of the SSD 110 between a pre-configured power-endurance modes, along with being able to be directly managed and set/configured by the host 102 (or any combination thereof). For example, the controller 112 may support autonomous power-endurance mode transitions. Autonomous power-endurance mode transitions provide a mechanism for the host 102 to configure the controller 112 to automatically transition between power-endurance modes on certain conditions without software intervention (or intervention by the host 102). For instance, an entry condition to transition to the idle transition power-endurance mode is that the controller 112 has been in idle for a continuous period of time exceeding an idle time prior to a transition time specified. The controller 112 is idle when there are no commands outstanding to any input/output (I/O) submission queue. If the controller 112 has an operation in process (e.g., device self-test operation) that would cause a power of the controller 112 to exceed that advertised for the proposed non-operational power-endurance mode, then the controller 112 should not autonomously transition to that state. The power-endurance mode to transition to shall be a non-operational power-endurance mode (a non-operational power-endurance mode may autonomously transition to another non-operational power-endurance mode). If an operational power-endurance mode is specified, then the controller should abort the command.

The DRAM 114 is a type of random access semiconductor memory that stores each bit of data in a memory cell consisting of a capacitor and a transistor. The memory arrays 116 include arrays of bit cells, each of which stores 1 bit of data, connected to wordlines and bitlines such that a single wordline activates bit cells in that row for each combination of address bits.

The interface bus 118 may be a peripheral component interconnect express (PCIe) device, which is a high-speed serial computer expansion bus that includes a physical interface (PHY) for encoding, scrambling, byte striping, disparity functionality on transmitter side, and reverse operations on the physical receiver side. The PCIe may further include logical sub-layers, corresponding to electrical and logical specifications, For example, the PCIe may include a logical sub-block, such as a media access control (MAC) sub-block.

The DMAs 120 are hardware/software features that enable access directly to the memory arrays 116, independent of the processors 134. The control path 122, the command parser 124, and the command executer 126 collectively provide command interpretation. The scheduler 130 controls data transfers while activating the control path 122 for fetching PRP lists, posting completion and interrupts, and activating the DMAs for the actual data transfer between the host 102 and the SSD 110.

The flash interface module 128 interacts with the memory arrays 116 (e.g., such as for read and write operations). The error correction engine 132 is responsible for correcting data fetched from the memory arrays 116. The processors 134 are electronic circuitry within SSD 110 that executes instructions/commands by performing arithmetic, logic, control, and input/output operations specified by the instructions/commands.

The power-performance-endurance PPEM module 140 (hereinafter PPEM module 140) is responsible for trading off between power-performance-endurance parameters by configuring the SSD 110 to work on selected conditions. The PPEM module 140 may receive the instructions/commands from the host 102 and act accordingly. The PPEM module 140 may also act independent of the instructions/commands from the host 102. The PPEM module 140 monitors at least power consumption, memory performance, and device endurance. Device endurance is non-conventional characteristic of the SSD 110 that describes an ability of the SSD 110 to remain active for a long period of time. The PPEM module 140 may specifically monitor device endurance using endurance levels, which are degrees or tiers of operations with respect to an operational life of the SSD 110.

In accordance with one or more embodiments, the PPEM module 140 implements an autonomous power-performance-endurance state transition feature to define and use multiple endurance levels, which in turn account for a wider variety of events that can cause the SSD 110 to switch from one power-endurance mode to another power-endurance mode. For example, conventionally, switching between power states was based on timing. In contrast, transitioning between the power-endurance modes by the autonomous power-performance-endurance state transition feature can be based on an average bit error rate (BER) threshold that triggers a switch (e.g., noise level instead of timing criteria).

In accordance with one or more embodiments, the autonomous power-performance-endurance state transition feature adds endurance levels to the SSD 110, such that the host 102 (e.g., a data center provider controlling the host 102) may configure dynamically the SSD 110 to different power-endurance modes. Once configured to a power-endurance mode, the autonomous power-performance-endurance state transition feature further provides an ability to tune the SSD 110 to different power-endurance modes, as a flexible trade-off between the power consumption, the memory performance, and the device endurance. Note that device endurance may be of major importance to data centers, as a target of the data center is to reduce operational costs, e.g., by increasing longevity of the SSDs therein. In this regard, tuning the SSD 110 based on endurance levels increases the terabytes written (TBW) of the SSD 110.

For example, in a case where performance can be compromised, the autonomous power-performance-endurance state transition feature provides one or more options to extend endurance (e.g., thereby extending the operational life). As an example option, when a slower programming procedure is acceptable for the SSD 110, the PPEM module 140 using the autonomous power-performance-endurance state transition feature can decrease a programming voltage window size (e.g., at an expense of a longer programming duration) by programming with a smaller voltage step size or the number of programming pulses. In turn, the technical effect and benefit includes reducing an accumulated stress on cells of the memory arrays 116 and increasing the PEC of any programmed cells (e.g., which translates to a longer operational life for the SSD 110).

As another example option, when an application (that is accessing the memory arrays 116) allows for a reduced exported capacity, the PPEM module 140 using the autonomous power-performance-endurance state transition feature can increase an overall TBW by reducing write amplification. As another example option, the PPEM module 140 using the autonomous power-performance-endurance state transition feature can apply shaping of programmed data, such that the programmed data utilizes power-endurance modes consuming less voltage. Note that the shaping by the PPEM module 140 can be allowed due to internal compressibility of input data or by an allocation of extra data at the SSD 110 to include longer shaped words.

In accordance with one or more embodiments, the autonomous power-performance-endurance state transition feature of the PPEM module 140 may be implemented as any data organization, management, and storage format that enable efficient access, use, and/or modification of data therein. In an example, the autonomous power-performance-endurance state transition feature is implemented as a power-endurance state descriptor data structure (e.g., a transitions table or a transition state machine). The power-endurance state descriptor data structure can be stored in the PPEM module 140 (and/or in the memory 104 of the host 102). Using the power-endurance state descriptor data structure, the SSD 110 and/or the PPEM module 140 can advertise to the host 102 operating conditions (e.g., present power consumption, throughput, memory status, endurance level, etc.). For instance, for the same power consumption, the SSD 110 may trade-off between throughput and endurance.

Figure 2:
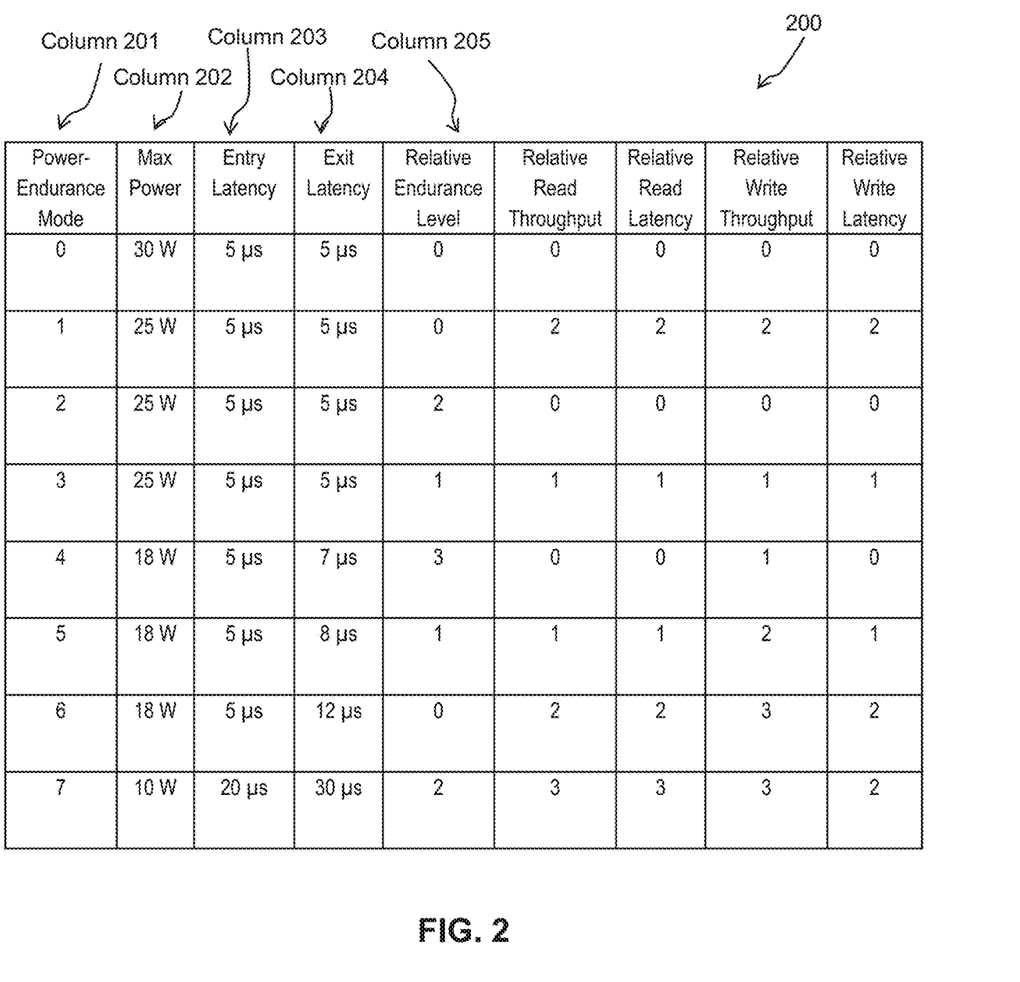
FIG. 2 is a table illustrating a power-endurance state descriptor data structure according to one or more embodiments.

Turning now to FIG. 2, a table 200 illustrating a power-endurance state descriptor data structure is provided according to one or more embodiments. The table 200 defines power-endurance modes, which can be configured within the SSD 110 of FIG. 1 to allow working modes with different power consumption. In this regard, the table 200 enables related trade-offs is between the power consumption, the memory performance, and the device endurance of the SSD 110 of FIG. 1. Note that the power-endurance state descriptor data structure may support at least one power-endurance mode and may optionally support up to a total of 32 power-endurance modes. The power-endurance modes may be contiguously numbered starting with zero, such that each subsequent power-endurance mode consumes less than or equal to the maximum power consumed in the previous state. Thus, power-endurance mode zero indicates the maximum power that the system 100 is capable of consuming.

The table 200 includes nine columns and nine rows (including a header row) depicting eight power-endurance modes defined according to a number of metrics (e.g., which allow the host 102 to make trade-off determinations between endurance operations and power consumptions). Note that the table 200 is illustrative and may include more or less fields in the power-endurance state descriptor. More particularly, column 201 of the table 200 identifies power modes 0-7. Power-Endurance Mode 0 is an "Extreme power, endurance & BW" mode, where BW stands for bandwidth. Power-Endurance Mode 1 is a "High power & endurance, low BW" mode. Power-Endurance Mode 2 is a "High power & BW, low endurance" mode. Power-Endurance Mode 3 is a "High power, mid BW, mid endurance" mode. Power-Endurance Mode 4 is a "Mid power, high BW, low endurance" mode. Power-Endurance Mode 5 is a "Mid power, mid BW, mid endurance" mode. Power-Endurance Mode 6 is a "Mid power, low BW, high endurance" mode. Power-Endurance Mode 7 is a "Low power, BW and endurance" mode. In an example implementation, the host 102 can configure each SSD 110 dynamically to operate in one of these power-endurance modes. Note that "high power" may include programming data at a voltage of five volts, while a "low power" may include programming data around one volt.

With respect to power consumptions of the SSD 110, the eight power-endurance modes of column 201 implement power management. In general, this power management allows the host 102 to manage power of the SSD 110 statically or dynamically. Static power management includes when the host 102 determines a maximum power that may be allocated to the SSD 110 and sets the power-endurance mode to one that consumes this amount of power or less. Dynamic power management includes when the host 102 modifies the power-endurance mode to best satisfy changing power and performance objectives. Note that the power management mechanism by the host 102 described herein is meant to complement and not replace autonomous power management or thermal management performed by the controller 112 of the SSD 110.

At column 202, a maximum (MAX) power field indicates a sustained maximum power that may be consumed in that state. The controller 112 may employ autonomous power management techniques to reduce power consumption below this level, but under no circumstances is power allowed to exceed this level except for non-operational power-endurance modes. At column 203, an entry latency field indicates a maximum amount of time in microseconds to enter that power-endurance mode. At column 204, an exit latency field indicates a maximum amount of time in microseconds to exit that state.

Further, the remaining columns of the table 200 depict relative endurance level, relative read throughput, relative read latency, relative write throughput, and relative write latency fields that provide an indication of relative performance in that power-endurance mode. Relative performance values provide an ordering of performance characteristics between power-endurance modes. Relative performance values may repeat, may be skipped, and may be assigned in any order (i.e., increasing power-endurance modes are not required to have increasing relative performance values).

A lower relative performance value indicates better performance (e.g., better endurance, higher throughput, or lower latency). For example, Power-Endurance Mode 1 has higher read throughput than Power-Endurance Mode 2, and Power-Endurance Modes 0 through 3 all have the same read latency.

In this regard, column 205 of the table 200 identifies relative endurance levels 0-3 (e.g., a plurality of endurance levels). Each relative endurance level 0-3 reflects a priority on endurance. In general, lower relative endurance levels place a higher priority on endurance. Conversely, higher relative endurance levels place a lower priority on endurance. As an example, as shown in column 201, if a desired relative endurance level is 3, then the selected mode can be the Power-Endurance Mode 4. As another example, if a desired relative endurance level is 1, then the selected mode can be the Power-Endurance Modes 3 or 5.

Relative performance ordering is only with respect to a single performance characteristic. Thus, although the relative read throughput value of one power-endurance mode may equal the relative write throughput value of another power-endurance mode, this does not imply that the actual read and write performance of these two power-endurance modes are equal.

Figure 3:
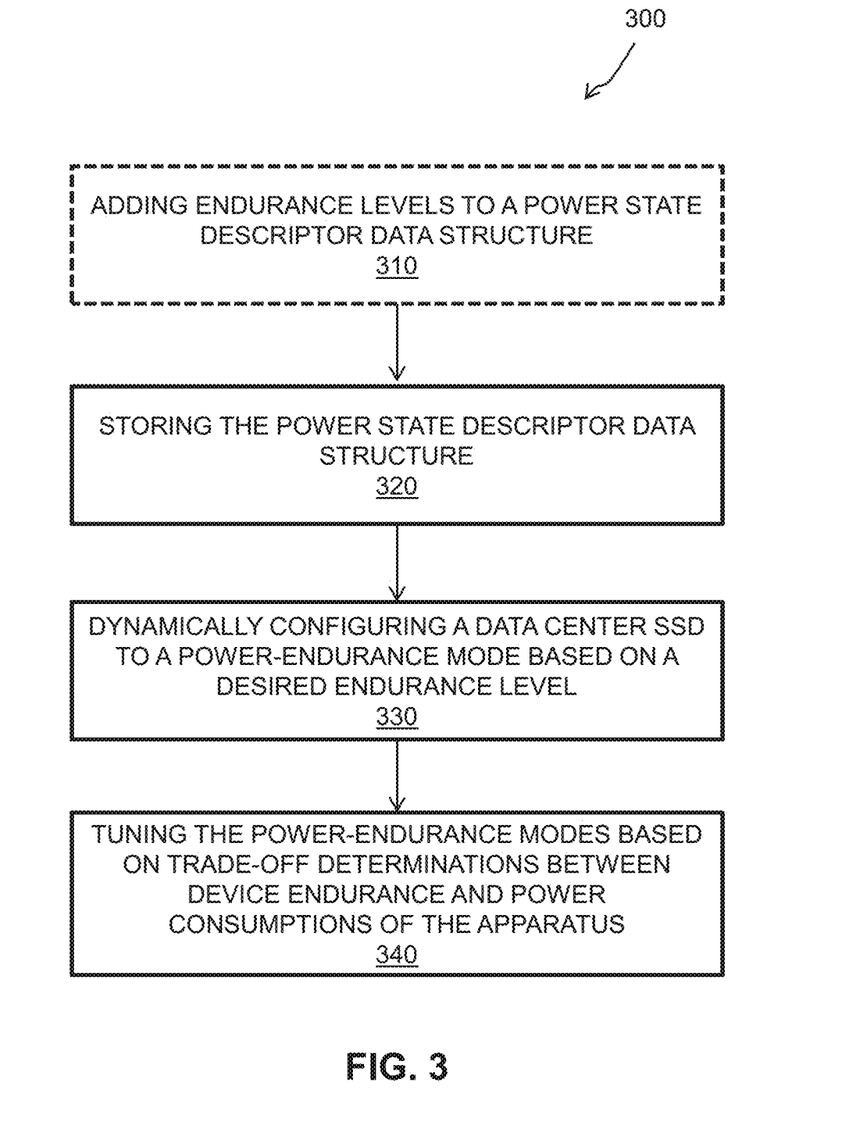
FIG. 3 is a flow diagram depicting a method for implementing power-endurance modes for data center SSDs according to one or more embodiments.

Turning now to FIG. 3, a flow diagram depicting a method 300 for implementing power-endurance modes for data center SSDs is provided according to one or more embodiments. For ease of understanding, the method 300 may be described herein with respect to FIGS. 1-2. The method 300, generally, increases SSDs TBW by accounting for device endurance so that data center providers can reduce costs for managing and operating the data center.

The method 300 begins at dashed-block 310, where endurance levels are added to a power state descriptor data structure. Note that dashed-block 310 is optional. That is, in cases where a host or a data center SSD presently utilizes NVMe standards, endurance levels can be added to those NVMe standards. In other cases, where the host or the data center SSD does not presently have any power consumption and memory performance, the entire power state descriptor data structure with the endurance levels may be provided. In an example with respect to FIG. 1, the host 102 may have a power state descriptor data structure that does not include endurance levels. In turn, the host 102 adds the relative endurance levels (e.g., as shown in FIG. 2) to the power state descriptor data structure.

At block 320, the power state descriptor data structure is stored. The power state descriptor data structure may be located in a memory of the host and/or the data center SSD. Continuing with the example with respect to FIG. 1, the host 102 may provide the power state descriptor data structure with the relative endurance levels added to the SSD 110. The SSD 110, in turn, stores the power state descriptor data structure with the relative endurance levels added in the PPEM module 140.

At block 330, the data center SSD is dynamically configured to a power-endurance mode based on a desired endurance level. The data center SSD may automatically configure the power-endurance mode based on a default configuration. The default configuration may correspond to a state that does not consume more power than a lowest value specified in the power state descriptor data structure (e.g., thereby selecting a highest endurance level). The host may directly instruct the data center SSD to select a power-endurance mode that corresponds to a specific desired endurance level. Continuing with the example with respect to FIG. 1, the host 102 may determine a current power-endurance mode (e.g., the default configuration of the SSD 110) using a Get Features command and/or dynamically modify the power-endurance mode using a Set Features command (which identifies a desired endurance level and associated power-endurance mode).

At block 340, the power-endurance mode is tuned based on trade-off determinations between endurance operations and power consumptions of the apparatus. That is, as the data center SSD operates either the host or the data center SSD can determine whether performance can be compromised, when an application allows for a reduced exported capacity, and/or when shaping of programmed data can be applied. Based on these determinations, a new power-endurance mode can be selected that enables the host or the data center SSD to decrease a programming voltage window size, increase an overall TBW, and/or apply shaping.

In accordance with one or more embodiments, the host may directly transition between or cause the data center SSD to transition between any two supported power-endurance modes. The maximum amount of time to transition between any two power-endurance modes is equal to the sum of the old state's exit latency and the new state's entry latency. The host is not required to wait for a previously submitted power-endurance mode transition to complete before initiating a new transition. The maximum amount of time for a sequence of power-endurance mode transitions to complete is equal to the sum of transition times for each individual power-endurance mode transition in the sequence.

Figure 4:
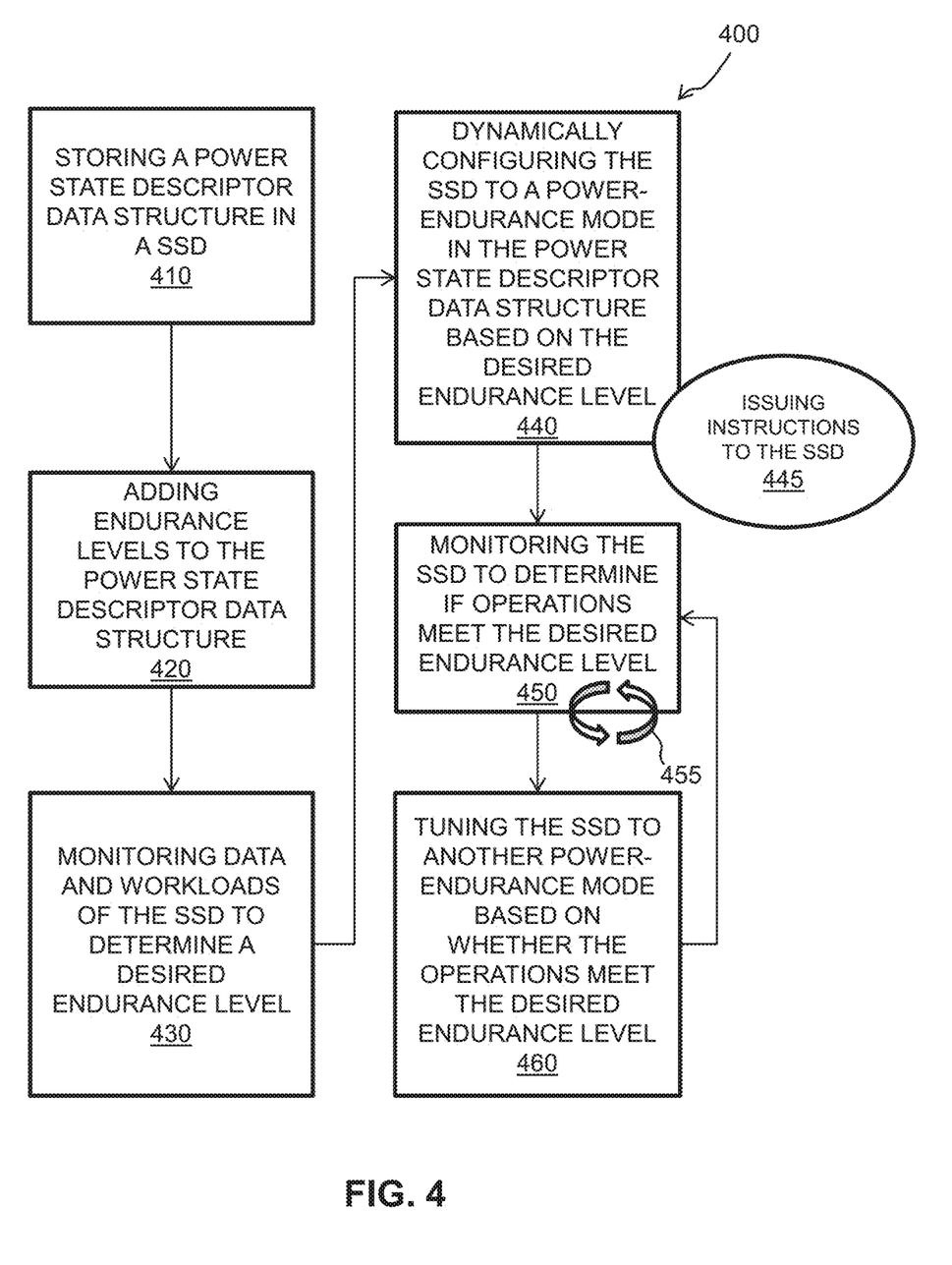
FIG. 4 is a flow diagram depicting a method for implementing power-endurance modes for data center SSDs according to one or more embodiments.

FIG. 4 is a flow diagram depicting a method 400 for implementing power-endurance modes for data center SSDs according to one or more embodiments. For ease of understanding, the method 400 may be described herein with respect to FIG. 5. The method 400, generally, increases SSDs TBW by accounting for device endurance so that data center providers can reduce costs for managing and operating the data center.

The method 300 begins at block 410, a host stores a power state descriptor data structure in a SSD connected thereto. At block 420, the host adds endurance levels are added to the power state descriptor data structure. At block 430, the host monitors data and workloads of the SSD to determine a desired endurance level. Note that the SSD may automatically be configured to a power-endurance mode based on a default configuration. As noted herein, the default configuration may correspond to a state that does not consume more power than a lowest value specified in the power state descriptor data structure (e.g., thereby selecting a highest endurance level).

At block 440, the host dynamically configures the SSD to a power-endurance mode based on a desired endurance level. In this regard, as shown by circle 445, the host may directly issue an instruction to the SSD, which causes the SSD to choose to a power-endurance mode that corresponds to the desired endurance level specified by the instructions. If more than one power-endurance mode corresponds to the desired endurance level, the SSD may select the power-endurance mode with the lowest relative endurance value (e.g., thereby exercising a highest endurance operation).

At block 450, the host monitors the SSD to determine if operations meet the desired endurance level. That is, as the SSD operates, the host can determine whether performance of the workloads on for the SSD can be compromised, whether software or application accessing data of the SSD can support a reduced exported capacity, and/or when shaping of programmed data can be applied. As indicated by arrows 455, this monitoring is continuous. At block 460, in accordance with the monitoring, the host tunes to another power-endurance mode based on whether the operations meet the desired power endurance level (e.g., the host decreases a programming voltage window size, increase an overall TBW, and/or apply shaping).

Figure 5:
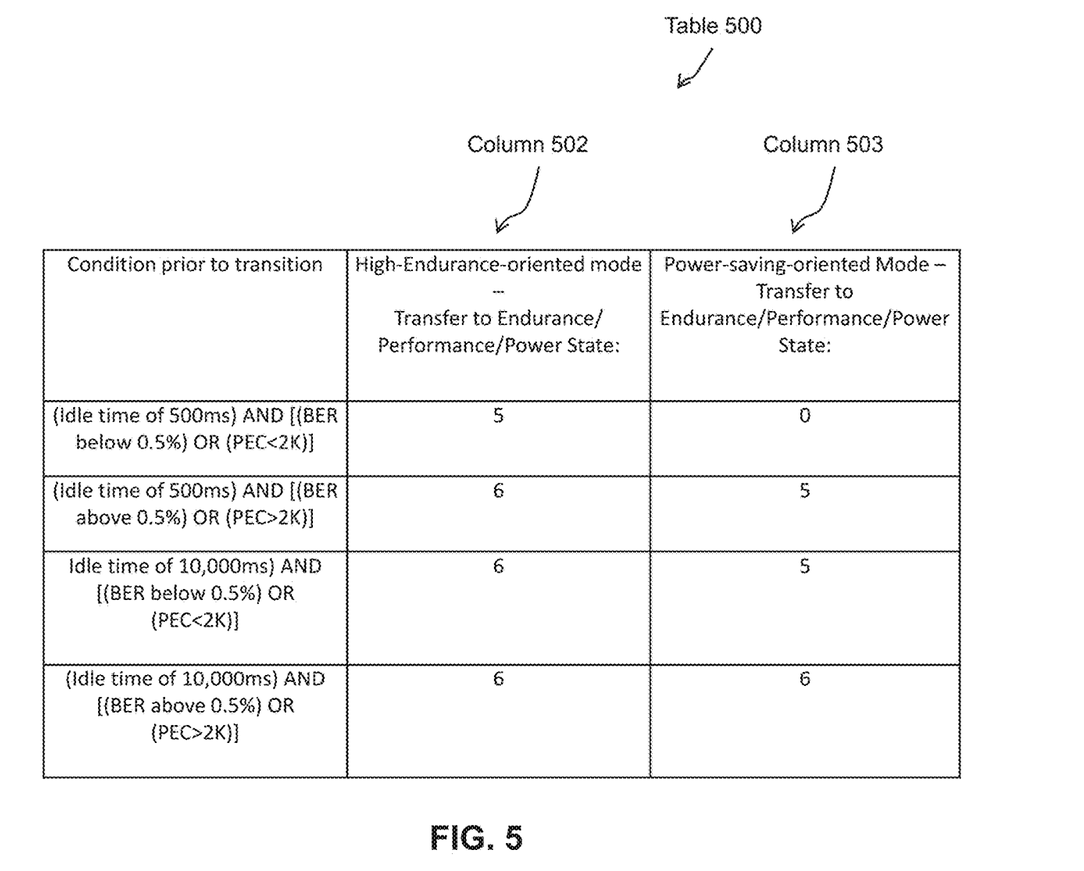
FIG. 5 is a table depicting operations of a system according to one or more embodiments.

Turning to FIG. 5, a table 500 depicting operations of a system is provided according to one or more embodiments. The table 500 is an autonomous power-endurance state transition table that demonstrates transitions between a Power-Endurance Mode 0 (Extreme power, BW and low-endurance level), a Power-Endurance Mode 5 (Mid power, BW and mid-endurance level), and Power-Endurance Mode 6 (Mid power, Mid BW and High-endurance level). Columns 502 and 503 describe the transition in one of 2 modes that are configured, in this example, by the host.

Thus, the technical effects of embodiments herein include optimizing device endurance (e.g., longevity that is related to a TBW terabyte rating) to prolong SSDs operations and reduce data centers expenses, which overcomes problems associated with conventional NVMe standards (i.e., these standards do not define endurance levels and compromise endurance with power). Thus, according to embodiments herein, hosts (e.g., specific data centers) can practically configure and tune SSDs based on device endurance, together with the power consumption (and the performance), as to allow increased flexibility in optimizing performance and costs.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. Similarly, the words "include," "including," and "includes" mean including, but not limited to. Also, as used herein, the word "may" is used in a permissive sense (i.e., meaning having the potential to), rather than the mandatory sense (i.e., meaning must).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to."

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

The descriptions of the various embodiments herein have been presented for purposes of illustration, but are not intended to be exhaustive or limited to the embodiments disclosed. That is, while the disclosure is susceptible to various modifications and alternative forms, specific embodiments thereof are shown by way of example in the drawings and will herein be described in detail. Many modifications and variations will be apparent to those of ordinary skill in the art without departing from the scope and spirit of the described embodiments. Thus, it should be understood, that the drawings and accompanying detailed description are not intended to limit the disclosure to the particular form illustrated, but on the contrary, the intention is to cover all modifications, equivalents and alternatives falling within the spirit and scope of the present disclosure, including those defined by the appended claims. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a plurality of memory arrays;
a power-performance-endurance manager module configured to:
store a power-endurance state descriptor data structure comprising a plurality of endurance levels associated with a plurality of power-endurance modes;
dynamically configure the apparatus to operate the plurality of memory arrays according to one of the plurality of power-endurance modes based on a desired endurance level of the plurality of endurance levels;
tune the apparatus, based on trade-off determinations between endurance operations and power consumptions of the apparatus, to another of the plurality of power-endurance modes respective to another desired endurance level of the plurality of endurance levels.

2. The apparatus of claim 1, wherein the power-performance-endurance manager module is configured to receive instructions from a host in communication with the apparatus, the instructions identifying the desired endurance level of the plurality of endurance levels for the power-performance-endurance manager module.

3. The apparatus of claim 1, wherein the desired endurance level comprises a reduced programming procedure that decreases a programming voltage window size or a voltage step size to reduce accumulated stress on cells of the plurality of memory arrays and to increase a program erase cycle.

4. The apparatus of claim 1, wherein the desired endurance level comprises a reduced exported capacity procedure that reduces a write amplification to increase an overall terabytes written.

5. The apparatus of claim 1, wherein the desired endurance level comprises a programmed data shaping procedure that reduces a number of high-voltage states based on internal compressibility of input data or based on allocation of extra data.

6. The apparatus of claim 1, further comprising:
a flash interface module configured to interact, based on the one of the plurality of endurance levels, with the plurality of memory arrays with respect to read and write operations.

7. The apparatus of claim 1, further comprising:
a scheduler configured to control data transfers while activating a control path for fetching physical region pages, posting completion and interrupts, or activating direct memory accesses.

8. The apparatus of claim 1, further comprising:
an error correction engine configured to correct data fetched from the plurality of memory arrays.

9. The apparatus of claim 1, further comprising:
a controller configured to incorporate a coupled dynamic random access memory used by the apparatus.

10. The apparatus of claim 1,
wherein the power-performance-endurance manager module is configured to implement autonomous power-endurance mode transitions between the plurality of power-endurance modes.

11. The apparatus of claim 1,
wherein the power-performance-endurance manager module is configured to operate one or more dies of the plurality of memory arrays according to the one of the plurality of power-endurance modes based on the desired endurance level.

12. The apparatus of claim 1, wherein the desired endurance level comprises a reduced programming procedure, a reduced exported capacity procedure, or programmed data shaping procedure.

13. A method comprising:
storing, by a power-performance-endurance manager module of a solid-state drive, a power-endurance state descriptor data structure comprising a plurality of endurance levels associated with a plurality of power-endurance modes;
dynamically configure, by the power-performance-endurance manager module, the solid-state drive to operate a plurality of memory arrays of the solid-state drive according to one of the plurality of power-endurance modes based on a desired endurance level of the plurality of endurance levels; and
tuning the solid-state drive, based on trade-off determinations between endurance operations and power consumptions of the solid-state drive, to another of the plurality of power-endurance modes respective to another desired endurance level of the plurality of endurance levels.

14. The method of claim 13, further comprising:
receiving instructions from a host in communication with the solid-state drive, the instructions identifying the desired endurance level of the plurality of endurance levels for the power-performance-endurance manager module.

15. The method of claim 13, wherein the desired endurance level comprises a reduced programming procedure that decreases a programming voltage window size or a voltage step size to reduce accumulated stress on cells of the plurality of memory arrays and to increase a program erase cycle.

16. The method of claim 13, wherein the desired endurance level comprises a reduced exported capacity procedure that reduces a write amplification to increase an overall terabytes written.

17. The method of claim 13, wherein the desired endurance level comprises a programmed data shaping procedure that reduces a number of high-voltage states based on internal compressibility of input data or based on allocation of extra data.

18. The method of claim 13, further comprising:
interacting, by a flash interface module of the solid-state drive based on the one of the plurality of endurance levels, with the plurality of memory arrays with respect to read and write operations.

19. The method of claim 13, further comprising:
controlling, by a scheduler of the solid-state drive, data transfers while activating a control path for fetching physical region pages, posting completion and interrupts, or activating direct memory accesses.

20. The method of claim 13, further comprising:
  correcting, by an error correction engine, data fetched from the plurality of memory arrays.

\* \* \* \* \*

UNITED STATES PATENT AND TRADEMARK OFFICE
CERTIFICATE OF CORRECTION

PATENT NO. : 11,379,031 B2
APPLICATION NO. : 16/917206
DATED : July 5, 2022
INVENTOR(S) : Ariel Navon et al.

It is certified that error appears in the above-identified patent and that said Letters Patent is hereby corrected as shown below:

In the Claims

In Claim 1, at Column 11, Line 24, please correct "levels;" to read --levels; and--.

Signed and Sealed this
First Day of November, 2022

Katherine Kelly Vidal
*Director of the United States Patent and Trademark Office*